United States Patent [19]

Kiuchi et al.

[11] Patent Number: 4,747,323
[45] Date of Patent: May 31, 1988

[54] CONTROL OF A VEHICLE POWER TRANSMISSION

[75] Inventors: Morio Kiuchi; Kazuo Oguri, both of Hiroshima, Japan

[73] Assignee: Mazda Motor Corporation, Hiroshima, Japan

[21] Appl. No.: 926,840

[22] Filed: Nov. 3, 1986

Related U.S. Application Data

[63] Continuation of Ser. No. 665,044, Oct. 26, 1984, abandoned.

[30] Foreign Application Priority Data

Oct. 28, 1983 [JP] Japan .................................. 58-202042

[51] Int. Cl.$^4$ ............................................. F16H 57/10
[52] U.S. Cl. ............................................................ 74/763
[58] Field of Search ................................. 74/762, 763

[56] References Cited

U.S. PATENT DOCUMENTS

| | | | |
|---|---|---|---|
| 3,300,001 | 1/1967 | Stockton | 74/763 X |
| 3,494,223 | 2/1970 | Mori | 74/763 X |
| 3,701,623 | 10/1972 | Mori et al. | 74/763 X |
| 3,859,872 | 1/1975 | Clauss, Jr. | 74/763 |
| 3,916,727 | 11/1975 | Pilet | 74/763 X |
| 4,224,837 | 9/1980 | Croswhite | 74/763 X |
| 4,226,123 | 10/1980 | Croswhite | 74/763 X |
| 4,331,044 | 5/1982 | Bookout et al. | 74/762 X |
| 4,400,998 | 8/1983 | Bookout et al. | 74/740 |
| 4,468,982 | 9/1984 | Fujita | 74/762 |

FOREIGN PATENT DOCUMENTS

| | | |
|---|---|---|
| 0017993 | 10/1980 | European Pat. Off. . |
| 0039937 | 11/1981 | European Pat. Off. . |
| 2651222 | 5/1978 | Fed. Rep. of Germany ........ 74/763 |
| 2830543 | 1/1980 | Fed. Rep. of Germany . |
| 2345630 | 10/1977 | France . |
| 57-1848 | 1/1982 | Japan . |
| 57-69144 | 4/1982 | Japan ..................................... 74/763 |
| 57-101151 | 6/1982 | Japan ..................................... 74/763 |
| 2035479 | 6/1980 | United Kingdom ................... 74/763 |
| 2037383 | 7/1980 | United Kingdom . |
| 2036897 | 7/1980 | United Kingdom . |

Primary Examiner—Leslie A. Braun
Assistant Examiner—Dwight G. Diehl
Attorney, Agent, or Firm—Fleit, Jacobson, Cohn & Price

[57] ABSTRACT

A vehicle power transmission device comprises a torque converter having an input member adapted to be connected with an engine output shaft and an output member, a multiple stage gear transmission mechanism, and a drive shaft having one end connected with the output member of the torque converter and passing through the gear mechanism. The gear mechanism includes a composite type planetary gear unit. A first clutch is provided and has a clutch drum connected with the drive shaft for connecting one gear unit element with the drive shaft through a one-way clutch, which permits power transmission from the drive shaft to the first sun gear. A second clutch is provided adjacent to the first clutch for connecting the drive shaft with the one element. A first brake is disposed with a brake drum around the second clutch and a brake band for frictional engagement with the brake drum. The first and second clutches can be arranged in the brake drum to provide a compact structure.

8 Claims, 3 Drawing Sheets

CONTROL OF A VEHICLE POWER TRANSMISSION

This application is a continuation of application Ser. No. 665,044, filed Oct. 26, 1984.

BACKGROUND OF THE INVENTION

1. Field of the Invention

The present invention relates to a vehicle power transmission system and more particularly to a power transmission system comprised of a hydraulic torque converter and a multiple-stage gear mechanism arranged in this order coaxially with respect to the axis of the engine crankshaft.

2. Description of the Prior Art

Conventional automatic power transmission assemblies for vehicles, particularly for engine-driven vehicles, generally include a torque converter having an impeller adapted to be connected with the engine crankshaft to be driven thereby, and a turbine which is connected with a multiple stage gear mechanism, such as a planetary gear mechanism provided with clutches and brakes for appropriately selecting one of several gear trains for obtaining a desired gear stage. In order to obtain a desired number of gear stages, for example, three or four gear stages, the planetary gear mechanism usually includes two or more planetary gear units which are arranged in series along the axis of the transmission assembly. The conventional transmission assembly has therefore a substantial longitudinal length and this makes it difficult to adopt this type of transmission in a front engine, front wheel drive type vehicle.

It has recently been recognized that in vehicles of front engine, front wheel drive type, it is advisable to arrange the engine with the crankshaft directed transversely of the vehicle body. Since the vehicle body has a limited transverse width, the transmission assembly is required to have an axial length which is as small as possible. However, the aforementioned conventional transmission cannot be designed to have a sufficiently small axial length.

In Japanese laid open patent application 57-1848, laid open to public inspection on Jan. 7, 1982 and corresponding to the U.S. patent application Ser. No. 149,060, filed on May 12, 1980, now U.S. Pat. No. 4,400,998, there is disclosed a vehicle transmission having a torque converter and a four-stage gear mechanism with a decreased axial length. According to the proposal by the laid open patent application, the gear mechanism comprises a composite planetary gear unit of the so-called Ravigneaux type having a pair of sun gears of different diameters, one or more first planetary pinions meshing with the smaller sun gear, one or more second planetary pinions meshing with the first planetary pinions and the larger sun gear, and a ring gear meshing with the second planetary pinions. A third-overdrive clutch is provided between the torque converter and the gear mechanism whereas a reverse lock one-way clutch and a low-second-third clutch are arranged in this order at an end axially opposite to the torque converter with respect to the gear mechanism. A disc type low-reverse brake and a disc type second-overdrive brake are arranged so as to overhang the gear mechanism, and a reverse clutch is at an axially outward position of the second-overdrive brake. An output gear is located between the torque converter and the third-overdrive clutch. The transmission assembly as proposed by the Japanese laid open application has a small axial length and is therefore considered as being suitable for use in a vehicle of front engine, front wheel drive type. It should however be noted that the low-reverse brake and the second-overdrive brake, which are arranged so as to overhang the gear mechanism, and the reverse clutch, which is arranged at an axially outward portion of the second-overdrive brake, unavoidably increase the diameter of the transmission assembly. It should further be noted that the proposed arrangement has no room for providing further elements such as clutches and one-way clutches which may be required for suppressing gear shifting shocks and decreasing gear shifting time.

OBJECTS OF THE INVENTION

It is an object of the present invention to provide a vehicle transmission having a compact structural arrangement.

Another object of the present invention is to provide a vehicle transmission having a small axial length so that it can readily be adopted in a vehicle of front engine, front wheel drive type having an engine mounted with its crankshaft axis directed in the transverse direction relative to the vehicle body.

A further object of the present invention is to provide a vehicle transmission including a torque converter and a multiple stage gear mechanism having a decreased axial and diametrical dimensions.

A still further object of the present invention is to provide a vehicle transmission having a multiple stage gear mechanism, in which gear shifting shocks can be minimized.

SUMMARY OF THE INVENTION

According to the present invention, the above and other objects can be accomplished by a vehicle power transmission device comprising a torque converter having an input member adapted to be connected with an engine output shaft and an output member, a multiple stage transmission gear mechanism coaxial with said torque converter, turbine shaft means extending coaxially with said torque converter and having one end connected with the output member of the torque converter, said transmission gear mechanism comprising a composite planetary gear unit including elements comprised of a first sun gear of a smaller diameter and a second sun gear of a larger diameter arranged on said turbine shaft, a ring gear, planetary pinion means between said sun gears and said ring gear and a planetary carrier for rotatably carrying said planetary pinion means, first clutch means located adjacent to one axial end of said turbine shaft means and adapted for connecting a first element in said planetary gear unit with said turbine shaft means through one-way clutch means which transmit one rotation from said turbine shaft means to said first element, second clutch means provided axially adjacent to said first clutch means for connecting said first element of the planetary gear unit with said turbine shaft means, third clutch means disposed in a substantially diametrically aligned relationship with respect to said first and second clutch means for connecting a second element in said planetary gear unit with said turbine shaft means, first brake means diametrically outward of and disposed in a substantially diametrically aligned relationship with respect to said first and second clutch means for constraining said second element in said planetary gear unit against rotation, second brake means diametrically outward of said planetary gear unit for constraining a third element of said planetary gear unit, fourth clutch means located adjacent to the other axial end of said planetary gear unit for connecting said third element of the planetary gear unit with said turbine shaft, output gear means located between the torque converter and said planetary gear unit and connected with an outpt element of said planetary gear unit which is an element other than said first, second and third elements.

In a preferable aspect of the present invention, the planetary pinion means includes at least one first pinion meshing with said first sun gear and at least one second pinion meshing with said first pinion, said second sun gear and said ring gear, said first sun gear being said first element, said second sun gear being said second element, said planetary carrier being said third element, said ring gear being said output element. The first brake means may be of a drum type having a brake drum provided with an outer peripheral surface for frictional engagement with a brake band, the brake drum defining an internal space in which said first and second clutch means one located. The third clutch means may then have a clutch hub provided on one axial end of the brake drum. Preferably, the first clutch means has a first clutch actuator cylinder housing which receives a first clutch actuator piston for actuating the first clutch means. The first clutch actuator piston may then define a second clutch actuator cylinder which receives a second clutch actuator piston for actuating the second clutch means. This arrangement is considered preferable because the first clutch means, which is subjected to a larger torque than the second clutch means, can be of a larger diameter to accommodate the larger torque.

DESCRIPTION OF THE PREFERRED EMBODIMENTS

General Arrangements

Figure 1:
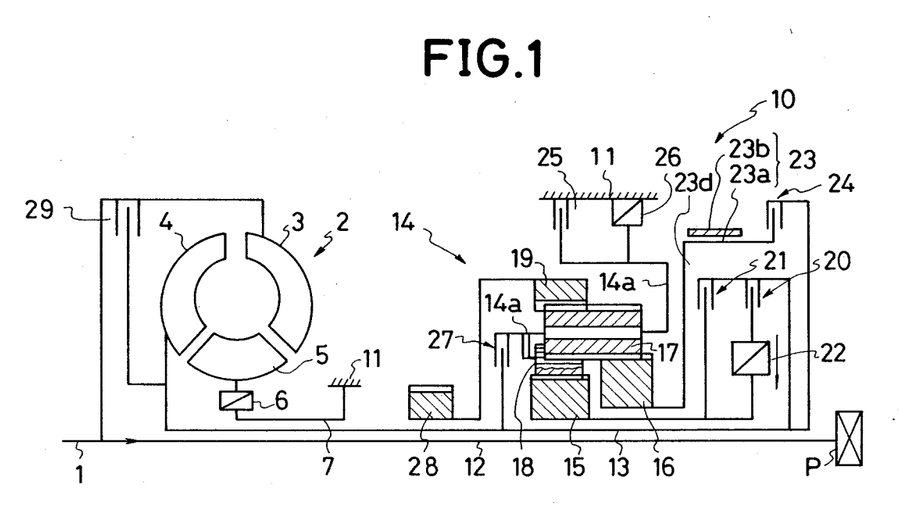
FIG. 1 is a schematic illustration of a transmission in accordance with one embodiment of the present invention.

Referring to the drawings, particularly to FIG. 1, there is shown a vehicle transmission including a torque converter 2 which is arranged coaxially with respect to an engine output shaft 1. The torque converter 2 includes a pump impeller 3 connected with the engine output shaft 1, a turbine 4 located in an opposing relationship with the pump impeller 3, and a stator 5 between the pump impeller 3 and the turbine 4. The stator 5 is carried through a one-way clutch 6 by a stationary shaft 7 which is secured to a casing 11 of the transmission. The one-way clutch 6 permits rotation of the stator 5 in the direction of rotation of the pump impeller 3 but prevents rotation in the opposite direction.

A transmission gear mechanism 10 is arranged coaxially with respect to the torque converter 2. There is a center shaft 12 having one end secured to the engine output shaft 1 and extending through the transmission gear mechanism 10. The other end of the center shaft 12 is connected with an oil pump P to drive the same. The torque converter 2 has a turbine shaft 13 which is connected at one end with the turbine 4. The turbine shaft 13 is of a tubular configuration through which the center shaft 12 passes. The turbine shaft 13 extends around the center shaft 12 through the transmission gear mechanism 10.

The transmission gear mechanism 10 includes a composite type planetary gear unit 14 which comprises a small diameter sun gear 15 and a large diameter sun gear 16 which are axially arranged on the turbine shaft 13 in this order as seen from the torque converter 2. A ring gear 19 is provided coaxially with the sun gears 15 and 16. One or more long planetary pinions 17 are in meshing engagement with the large sun gear 16 and the ring gear 19 whereas one or more short planetary pinions 18 are in meshing engagement with the small sun gear 15 and the long planetary pinions 17. A planetary carrier 14a, rotatably supports the planetary pinions 17 and 18.

Adjacent to an axial end of the gear unit 14 opposite to the torque converter 2, there is located first clutch 20 which functions to connect the turbine shaft 13 through a one-way clutch 22 with the small sun gear 15. The one-way clutch 22 is of a type which transmits rotation from the turbine shaft 13 to the small sun gear 15. Between the first clutch 20 and the gear unit 14, there is a second clutch 21 which functions to connect the turbine shaft 13 with the small sun gear 15. It will be noted that the second clutch 21 is arranged in parallel with the first clutch 20.

Diametrically outward of the first and second clutches 20 and 21 and diametrically aligned therewith, there is provided a first brake 23 comprising a brake drum 23a and a brake band 23b which is adapted to engage frictionally with the cylindrical outer peripheral surface of the brake drum 23a. At one end of the brake drum 23a, there is provided a third clutch 24 which functions to connect the turbine shaft 13 with the brake drum 23a. The other end of the brake drum 23a is connected with the large sun gear 16. It will be noted that the brake drum 23a defines an internal space 23d in which the first and second clutches 20 and 21 are located.

Diametrically outward of the gear unit 14 and diametrically aligned therewith is a second brake 25 which functions to connect the planetary carrier 14a with the casing 11 of the transmission for constraining the planetary carrier 14a against rotation. In parallel with the second brake 25, there is provided a second one-way clutch 26 which functions between the planetary carrier 14a and the casing 11 to prevent rotation of the planetary carrier in a reverse direction but to permit rotation in a forward direction. At an axial end of the gear unit 14 adjacent to the torque converter 2, there is a fourth clutch 27 which functions to connect the planetary carrier 14a with the turbine shaft 13. Between the fourth clutch 27 and the torque converter 2, there is provided an output gear 28 which is mounted on the turbine shaft 13 for rotation and connected with the ring gear 19. In the illustrated embodiment, the torque converter 2 has a lock-up clutch 29 between the pump impeller 3 and the turbine shaft 13.

Detailed Arrangement

Figure 2:
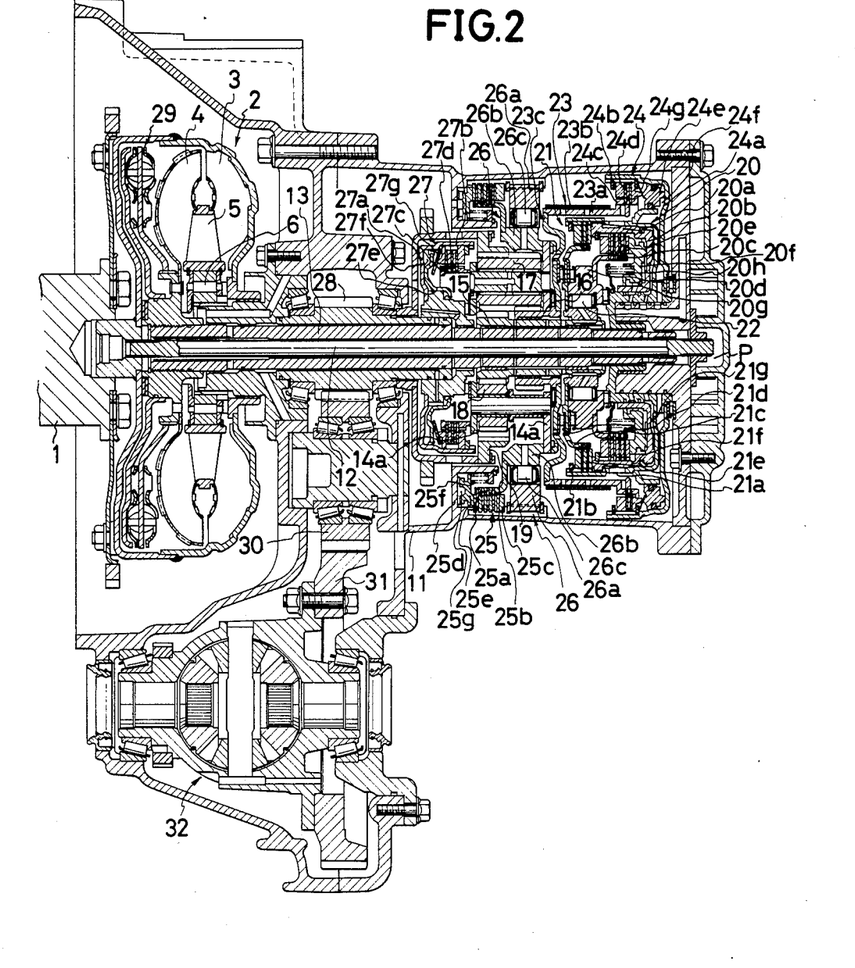
FIG. 2 is a sectional view showing detailed structures of the transmission shown in FIG. 1; and, FIG. 3 is fragmentary sectional view showing another embodiment of the present invention.

Detailed arrangements will now be described with reference to FIG. 2.

The Second Clutch 21

The second clutch 21 includes a bell-shaped clutch housing 21a which is connected at a diametrically inner portion with the turbine shaft 13 through splines so that the clutch housings 21a rotates with the turbine shaft 13. The clutch housing 21a has a diametrically outward cylindrical portion defining a clutch drum 21b. Within the clutch drum 21b, there is a clutch hub 21c which is carried by a support 21d connected through splines with the small sun gear 15. The clutch drum 21b and the clutch hub 21c carries alternately arranged clutch discs 21e. Within the bell-shaped clutch housing 21a, there is disposed an annular piston 21f which has an outer surface connected through splines with the inner surface of the clutch drum 21d so that the piston 21f is axially slidable but rotates with the clutch housing 21a. The piston 21f defines a pressure chamber 21g with the clutch housing 21a. Hydralic pressure applied to the pressure chamber 21g functions to shift the piston 21f axially toward the gear unit 14 so as to make the clutch discs 21e engage with each other. When the hydralic pressure is released from the pressure chamber 21g, the second clutch 21 is released.

The First Clutch 20

The piston 21f of the second clutch 21 also defines a clutch drum 20a and a clutch housing 20b of the first clutch 20. As described previously, the piston 21f is slidable axially with respect to the clutch housing 21a but rotates therewith so that driving torque is transmitted from the turbine shaft 13 through the clutch housing 21a to the piston 21f. The clutch drum 20a defined by the piston 21f forms an internal space in which a clutch hub 20c is located. The clutch hub 20c is carried by a support 20d which constitutes an outer race of the one-way clutch 22. The inner race of the one-way clutch 21 is defined by the support 21d of the second clutch 21.

The clutch drum 20a and the clutch hub 20c carry alternately arranged clutch discs 20e. In the clutch housing 20b, there is disposed a piston 20f which defines a pressure chamber 20g with the clutch housing 20b. Hydraulic pressure applied to the pressure chamber 20g serves to force the piston 205 to thereby make the clutch discs 20e engage with each other. When the hydraulic pressure is released from the pressure chamber 20g, the first clutch 20 is relesed. A return spring 20h is provided for forcing the piston 20f toward the pressure chamber 20g to release the first clutch 20. The spring 20h also functions to force the piston 21f of the second clutch 21 in the clutch releasing sense.

The First Brake 23

The first brake 23 includes the aforementioned brake drum 23a which is disposed around the first and second clutches 20 and 21. The brake drum 23a is connected through a drum support 23c with the large sun gear 16. The brake band 23b is arranged to engage the outer peripheral surface of the brake drum 23a to lock the brake drum 23a and therefore the large sun gear 16.

The Third Clutch 24

The third clutch 24 includes a bell-shaped clutch housing 24a which is connected at a diametrically inner portion with the clutch housing 21a of the second clutch 21. The clutch housing 24a has a diametrically outer portion defining a clutch drum 24b. Within the clutch drum 24b, there is a clutch hub 24c which is formed at the free end of the brake drum 23a of the first brake 23. The clutch drum 24b and the clutch hub 24c carry alternately arranged brake discs 24d. In the clutch housing 24a, there is a piston 24e which defines a pressure chamber 24f. When hydraulic pressure is applied to the pressure chamber 24f, the piston 24e is forced to make the clutch discs 24d engage with each other. When the hydraulic pressure is released from the pressure chamber 24f, the third clutch 24 is released. A diaphragm type return spring 24g is provided for forcing the piston 24e in the clutch releasing direction. The diaphragm type spring is preferable because it does not require a large space.

The Fourth Clutch 27

The fourth clutch 27 includes a bell-shaped clutch housing 27a which is connected at a diametrically inner portion with the turbine shaft 13. The clutch housing 27a has a substantially cylindrical outer portion defining a clutch drum 27b. Diametrically inward of the clutch arm 27a, there is a clutch hub 27c which is connected with the planetary carrier 14a of the gear unit 14. The clutch drum 27b and the clutch hub 27c carry alternately arranged brake discs 27d. In the clutch housing 27a, there is disposed a piston 27e which is made of sheet metal. There is formed a pressure chamber 27f between the piston 27e and the clutch housing 27a so that hydraulic pressure applied to the pressure chamber functions to force the piston 27e toward the clutch discs 27d, to thereby make the clutch discs 27d engage with each other. When the hydraulic pressure is released from the pressure chamber 27f, the fourth clutch 27 is released. A diaphragm type return spring 27g is provided for forcing the piston 27e in the clutch releasing direction.

The Second Brake 25

The second brake 25 is of a disc type having a brake drum 25a carried by a support 25b which is connected with the planetary carrier 14a of the gear unit 14. A disc carrier 25c is mounted through axial splines on the casing 11. The brake drum 25a and the disc carrier 25c on the casing 11 of the transmission carry alternately arranged brake discs 25d. In the casing 11, there is formed an annular cylinder 25d in which a piston 25e is disposed. The piston 25e defines a pressure chamber 25g in the cylinder 25d so that hydraulic pressure applied to the pressure chamber 25g forces the piston 25e toward the brake discs 25c to thereby make the clutch discs 25c engage with each other. A return spring 25f is provided to force the piston 25e in the brake releasing direction. The one-way clutch 26 is provided adjacent the brake 25. The one way clutch 26 includes an outer race 26a which is mounted on the casing 11 through axial splines, an inner race 26b connected with the support 25b. Between the outer and inner races 26a and 26b, there are sprags 26c.

Functions of the Transmission Gear Mechanism 10

The gear mechanism 10 provides four forward drive gear stages and one reverse drive gear stage, which can be selected by appropriately engaging the clutches 20, 21, 24 and 27 and the brakes 23 and 25. The relationship between the gear stages and the operations of the clutches and brakes are shown in the table.

|   | CLUTCH | | | | BRAKES | | ONE-WAY CLUTCH | |
|---|---|---|---|---|---|---|---|---|
|   | 24 | 20 | 21 | 27 | 25 | 23 | 26 | 22 |
| P |   |   |   |   |   |   |   |   |
| R |   | o |   |   | o |   |   |   |

-continued

| | | CLUTCH | | | | BRAKES | | ONE-WAY CLUTCH | |
|---|---|---|---|---|---|---|---|---|---|
| | | 24 | 20 | 21 | 27 | 25 | 23 | 26 | 22 |
| N | | | | | | | | | |
| D-RANGE | 1st | o | o | | | | | (o) | (o) |
| | 2nd | o | o | o | | | o | | (o) |
| | 3rd | o | o | o | | | | | (o) |
| | OD | o | | | | | o | | |
| 2-RANGE | 1st | o | o | | | | | (o) | (o) |
| | 2nd | o | o | | | | o | | (o) |
| | 3rd | o | o | o | | | | | (o) |
| 1-RANGE | 1st | o | o | | o | | | (o) | (o) |
| | 2nd | o | o | | | | o | | (o) |

The Second One-Way Clutch 26

The second one-way clutch 26 functions to prevent reverse rotation of the planetary carrier 14a in the first gear stage. Further, the second one-way clutch 26 also functions in shifting operations from the first gear stage to the second or vice versa. In the gear mechanism 10, the planetary carrier 14a must be prevented from reverserotation for the first gear stage, but it must be allowed to rotate in a forward direction for the second gear stage. Referring to the operation of the brake 23, however, it must be released for the first gear stage but engaged for the second gear stage. In shifting up from the first gear stage to the second gear stage, as soon as the brake 23 is engaged, the planetary carrier 14a is allowed to rotate in the forward direction without any time delay to accomplish the second gear stage due to the function of the second one-way clutch 26.

The One-Way Clutch 22

The one-way clutch 22 functions in shifting from the third gear stage to the fourth gear stage or vice versa. As noted in the table, the clutches 21 and 27 are engaged for the third gear stage to make the elements of the gear unit 14 rotate as a unit, whereas the clutch 21 is released to make the small sun gear 15 rotate with an increased speed and the brake 23 is engaged to lock the large sun gear 16 for the fourth gear stage. When the shifting up operation occurs from the third to the fourth gear stages only by the friction clutches and friction brakes, it is necessary to control the operations of such clutches and brakes in time sequences so that the neutral condition is momentarily produced. However, by providing the one-way clutch 22, the small sun gear 15 is started to be driven at an increased speed as soon as the brake 23 is engaged to lock the large sun gear 16, so that the shifting-up operation can be carried out smoothly without any time delay.

Further, in shifting down from the fourth gear stage to the third gear stage, the connection of the small sun gear 15 with the turbine shaft 13 must be delayed until the engine speed is sufficiently increased or the speed of the ring gear 19 is sufficiently decreased. It is therefore a very difficult task to appropriately control the timing of engagement of the small sun gear 15 with the turbine shaft 13. By adopting the one-way clutch 22, however, it becomes possible to start to transmit the rotation of the turbine shaft 13 to the small sun gear 15 as soon as the speed of the small sun gear 15 becomes equal to the engine speed.

Other Structures

The output gear 28 is engaged with an intermediate gear 30 which is in turn in meshing engagement with an input gear 31 of a differential gear mechanism 32.

Alternative Embodiment

Figure 3:
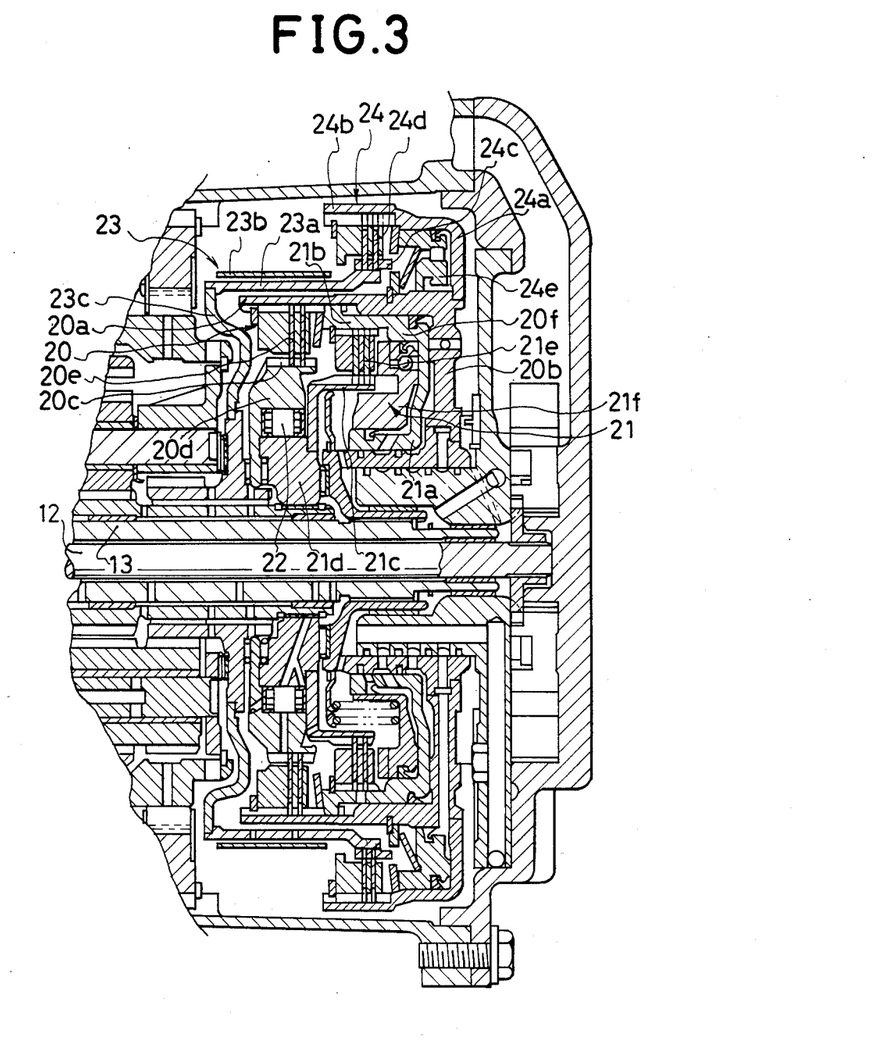

FIG. 3 shows an alternative embodiment of the present invention. In this embodiment, the first clutch 20 is located closer to the gear unit 14 than is the second clutch 21. The first clutch 20 includes a clutch drum 20a formed on the cylindrical outer portion of a clutch housing 20b, which is spline connected with the turbine shaft 13. The clutch housing 24a of the third clutch 24 is connected with the clutch housing 20b. A clutch hub 20c is formed on an outer race 20d of the one-way clutch 22, which has an inner race 21d which is splined to the turbine shaft 13. The clutch drum 20a and the clutch hub 20c carry clutch discs 20e as in the previous embodiment. An annular piston 20f is disposed in the clutch housing 20b.

In this embodiment, the piston 20f for the first clutch 20 is engaged at its outer surface with the inner surface of the clutch housing 20b so that the piston 20f is axially slidable with respect to the clutch housing 20b, but rotates together with the clutch housing 20b to transmit the rotation of the turbine shaft 13. The piston 20f also defines a clutch housing 21a of the second clutch 21, and a clutch drum 21b is formed at the cylindrical outer portion thereof. In the clutch housing 21a, there is disposed a clutch hub 21c which is connected with the inner race 21d of the one-way clutch 22. The clutch drum 21b and the clutch hub 21c carry clutch discs 21e as in the previous embodiment. In the clutch housing 21a, there is a piston 21f for forcing the clutch discs 21e into engagement with each other.

This embodiment is considered advantageous in that the first clutch 20 can be of a larger diameter than the second clutch 21. The first clutch 20 is used for transmitting forward drive torque whereas the second clutch 21 is used in the case where engine braking is needed. Therefore, the first clutch 20 is subjected to a greater torque than the second clutch 21 and it is preferable to have a larger diameter.

The invention has thus been shown and described with reference to specific embodiment. However it should be noted that the invention is in no way limited to the details of the illustrated structures, but changes and modifications may be made without departing from the scope of the appended claims.

We claim:

1. A vehicle power transmission device for a front engine, front wheel drive type vehicle having an output shaft extending transversely of the vehicle, said transmission device comprising a torque converter having an input member coaxial with and adapted to be connected with an engine output shaft and an output member, a multiple stage gear transmission mechanism, a drive shaft having one end connected with the output member of the torque converter and passing through the gear mechanism, said gear mechanism including a composite type planetary gear unit including a first sun gear having a first diameter and a second sun gear having a second diameter larger than said first diameter, said first and second sun gears mounted rotatably on the drive shaft in this order as seen from the torque converter, a ring gear coaxial with the sun gears, at least one long planetary pinion which is in meshing engagement with the second sun gear and the ring gear and at least one long planetary pinion which is in meshing engagement with the second sun gear and the ring gear and at least one short planetary pinion which is in meshing engagement with the first sun gear and the long planetary pinion, first clutch means located at an end of said gear transmission opposite to said torque converter and adapted for connecting the first sun gear with the drive shaft through first one-way clutch means which permits power transmission from the drive shaft to the first sun gear, second clutch means adjacent to said first clutch means for connecting said drive shaft with the first sun gear said first clutch means including a clutch drum, a drum-shaped first piston disposed in and splined with said clutch drum for axial sliding movement, a first clutch hub disposed in said clutch drum and connected through said first one-way clutch means with the first sun gear of the gear unit, first clutch discs carried alternately by said clutch drum and said first clutch hub, and adapted to be forced by said first piston into engagement with each other, said second clutch means including a second piston disposed in said first piston for axial sliding movement, a second clutch hub disposed in said first piston and connected with the first sun gear of the gear unit, second clutch discs carried alternately by said first piston and said second clutch hub and adapted to be forced together by said second piston for engagement with each other, first drum-type brake means having a brake drum disposed around said second clutch means and a brake band for frictional engagement with the brake drum, said brake drum being connected with said second sun gear, third clutch means disposed diametrically outward of the first clutch means and having an element carried by said brake drum for connecting the drive shaft with the second sun gear through said brake drum of the first brake means, second brake means disposed diametrically outward of the gear unit and including friction means having friction discs for frictionally constraining said planetary carrier against rotation, said second brake means including a disc carrier for carrying said discs and mounted on a stationary part of the transmission through axial splines, second one-way clutch means disposed between said first and second brake means for connecting said planetary carrier of the gear unit with a stationary part of the transmission device for allowing rotation in only one direction of the planetary carrier when said friction means of the second brake means is engaged, fourth clutch means disposed adjacent to an axial end of the gear unit adjacent to said torque converter for connecting the drive shaft with the planetary carrier, an output member mounted on said drive shaft between said torque converter and the fourth clutch means and connected with the ring gear of the gear unit, differential gear means located adjacent to the torque converter and having output shafts which are parallel with said drive shaft, said differential gear means having an input gear coaxial with said output shafts of the differential gear means and engaged with said output member through an intermediate gear having an axis parallel with said drive shaft, said second one-way clutch means being located adjacent to said second brake means, said second one-way clutch means and said second brake means being located diametrically outward of the planetary gear unit.

2. A transmission device in accordance with claim 1 in which said second brake means includes friction means for frictionally constraining said planetary carrier, one-way clutch means provided in parallel with the friction means for allowing rotation in one direction of the planetary carrier when the friction means is disengaged, said friction means including friction discs, said second brake means including a disc carrier for carrying said discs and mounted on a stationary part of the transmission through axial splines.

3. A vehicle power transmission device comprising a torque converter having an input member adapted to be connected with an engine output shaft and an output member, a multiple stage transmissiongear mechanism coaxial with said torque converter, turbine shaft means extending coaxially with said torque converter and having one end connected with the output member of the torque converter, said transmission gear mechanism comprising a composite planetary gear unit including a first sun gear having a first diameter and a second sun gear having a second diameter larger than said first diameter and arranged on said turbine shaft, a ring gear, at least one first pinion meshing with said first sun gear, at least one second pinion meshing with said first pinion, said second sun gear and said ring gear, and a planetary carrier for rotatably carrying said pinions, first clutch means located adjacent to one axial end of said turbine shaft means and adapted for connecting said first sun gear with said turbine shaft means through first one-way clutch means which transmit rotation from said turbine shaft means to said first sun gear, second clutch means provided axially adjacent to said first clutch means for connecting said first sun gear of the planetary gear unit without an intervention of said first one-way clutch means with said turbine shaft means, third clutch means disposed in a substantially diametrically aligned relationship with respect to said first and second clutch means for connecting said second sun gear in said planetary gear unit with said turbine shaft means, first brake means diametrically outward of and disposed in a substantially diametrically aligned relationship with respect to said first and second clutch means for constraining said second sun gear in said planetary gear unit against rotation, second brake means diametrically outward of said planetary gear unit for constraining said planetary carrier of said planetary gear unit, fourth clutch means located adjacent to the other axial end of said planetary gear unit for connecting said planetary carrier of the planetary gear unit with said turbine shaft, second one-way clutch means for allowing only a forward rotation but constraining a reverse rotation of the planetary carrier, output gear means located between the torque converter and said planetary gear unit and connected with said ring gear of said planetary gear unit, said first brake means being of a drum type having a brake drum provided with an outer peripheral surface for frictional engagement with a brake band, the brake drum defining an internal space in which said first and second clutch means are located, said brake drum being located closer to said planetary gear unit than is said third clutch means and carrying an element of said third clutch means, said second one-way clutch means being located between said first and second brake means adjacent to said second brake means and diametrically outward of said planetary gear unit, said first clutch means including a first clutch drum connected with said turbine shaft and a first piston disposed in said first clutch drum, said first piston defining a second clutch drum for the second clutch means, a second piston for the second clutch means being disposed in said first piston.

4. A transmission device in accordance with claim 3 in which said first clutch means includes a first clutch hub disposed in the first clutch drum and clutch discs carried by said first clutch drum and said first clutch hub, said second clutch means including a second clutch hub disposed in the second clutch drum and clutch discs carried by said second clutch drum and said second clutch hub.

5. A transmission device in accordance with claim 3 in which said one-way clutch means includes an outer race, an inner race and one-way clutch elements between the outer and inner races, said inner race being connected with said one element of the gear unit, said first clutch hub being connected with said outer race, said second clutch hub being connected with said inner race.

6. A transmission device in accordance with claim 3 in which said third clutch means has a third clutch drum which is connected with the first clutch drum.

7. A vehicle power transmission device for a front engine, front wheel drive type vehicle hhaving an output shaft extending transversely of the vehicle, said transmission device comprising a torque converter having an input member coaxial with and adapted to be connected with an engine output shaft and an output member, a multiple stage gear transmission mechanism, a drive shaft having one end connected with the output member of the torque converter and passing through the gear mechanism, said gear mechanism including a composite type planetary gear unit including a first sun gear having a first diameter and a second sun gear having a second diameter larger than said first diameter, said first and second sun gears mounted rotatably on the drive shaft in this order as seen from the torque converter, a ring gear coaxial with the sun gears, at least one long planetary pinion which is in meshing engagement with the second sun gear and the ring gear at least one short planetary pinion which is in meshing engagement with the first sun gear and the long planetary pinion, first clutch means located at an end of said gear transmission opposite to said torque converter and adapated for connecting the first sun gear with the drive shaft through first one-way clutch means which permits power transmission from the drive shaft to the first sun gear, second clutch means adjacent to said first clutch means for connecting said drive shaft with the first sun gear said second clutch means including a clutch drum, a drum-shaped first piston disposed in said clutch drum for axial sliding movement, a second piston disposed in said first piston for axial sliding movement, a first clutch hub disposed in said clutch drum and connected with the first sun gear of the gear unit, first clutch discs carried alternately by said clutch drum and said first clutch hub and adapted to be forced by said first piston into engagement with each other, said first clutch means including a second clutch hub disposed in said first piston and connected with said first sun gear of the gear unit, second clutch discs carried alternately by said first piston and said second clutch hub and adapted to be forced together by said second piston for engagemen with each other, first drum-type brake means having a brake drum disposed around said second clutch means and a brake band for frictional engagement with the brake drum, said brake drum being connected with said second sun gear, third clutch means disposed diametrically outward of the first clutch means and having an element carried by said brake drum for connecting the drive shaft with the second sun gear through said brake drum of the first brake means, second brake means disposed diametrically outward of the gear unit and including friction means having friction discs for frictionally constraining said planetary carrier against rotation, said second brake means including a disc carrier for carrying said discs and mounted on a stationary part of the transmission through axial splines, second one-way clutch means disposed between said first and second brake means for connecting said planetary carrier of the gear unit with a stationary part of the transmission device for allowing rotation in only one direction of the planetary carrier when said friction means of the second brake means is engaged, fourth clutch means disposed adjacent to an axial end of the gear unit adjacent to said torque converter for connecting the drive shaft with the planetary carrier, an output member mounted on said drive shaft between said torque converter and the fourth clutch means and connected with the ring gear of the gear unit, differential gear means located adjacent to the torque converter and having output shafts which are parallel with said drive shaft, said differential gear means having an input gear coaxial with said output shafts of the differential gear means and engaged with said output member through an intermediate gear having an axis parallel with said drive shaft, said second one-way clutch means being located adjacent to said second brake means, said second one-way clutch means and said second brake means being located diametrically outward of the planetary gear unit.

8. A vehicle power transmission device comprising a torque converter having an input member adapted to be connected with an engine output shaft and an output member, a multiple stage transmission gear mechanism coaxial with said torque converter, turbine shaft means extending coaxially with said torque converter and having one end connected with the output member of the torque converter, said transmission gear mechanism comprising a composite planetary gear unit including a first sun gear having a first diameter and a second sun gear having a second diameter larger than said first diameter and arranged on said turbine shaft, a ring gear, at least one first pinion meshing with said first sun gear, at least one second pinion meshing with said first pinion, said second sun gear and said ring gear, and a planetary carrier for rotatably carrying said pinions, first clutch means located adjacent to one axial end of said turbine shaft means and adapted for connecting said first sun gear with said turbine shaft means through first one-way clutch means which transmit rotation from said turbine shaft means to said first sun gear, second clutch means provided axially adjacent to said first clutch means for connecting said first sun gear of the planetary gear unit without an intervention of said first one-way clutch means with said turbine shaft means, third clutch means disposed in a substantially diametrically aligned relationship with respect to said first and second clutch means for connecting said second sun gear in said planetary gear unit with said turbine shaft means, first brake means diametrically outward of and disposed in a substantially diametrically aligned relationship with respect to said first and second clutch means for constraining said second sun gear in said planetary gear unit against rotation, second brake means diametrically outward of said planetary gear unit for constraining said planetary carrier of said planetary gear unit, fourth clutch means located adjacent to the other axial end of said planetary gear unit for connecting said planetary carrier of the planetary gear unit with said turbine shaft, second one-way clutch means for allowing only a forward rotation but constraining a reverse rotation of the planetary carrier, output gear means located between the torque converter and said planetary gear unit and connected with said ring gear of said planetary gear unit, said first brake means being of a drum type having a brake drum provided with an outer peripheral surface for frictional engagement with a brake band, the brake drum defining an internal space in which said first and second clutch means are located, said brake drum being located closer to said planetary gear unit than is said third clutch means and carrying an element of said third clutch means, said second one-way clutch means being located between said first and second brake means adjacent to said second brake means and diametrically outward of said planetary gear unit, said second clutch means including a first clutch drum connected with said turbine shaft and a first piston disposed in said first clutch drum, said first piston defining a second clutch drum for the first clutch means, a second piston for the first clutch means being disposed in said first piston.

* * * * *